(12) United States Patent
Lin

(10) Patent No.: US 10,091,772 B2
(45) Date of Patent: Oct. 2, 2018

(54) METHOD AND APPARATUS FOR CHANNEL STATE INFORMATION MEASUREMENT IN A WIRELESS COMMUNICATION SYSTEM

(71) Applicant: INNOVATIVE SONIC CORPORATION, Taipei (TW)

(72) Inventor: Ko-Chiang Lin, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 134 days.

(21) Appl. No.: 14/160,976

(22) Filed: Jan. 22, 2014

(65) Prior Publication Data
US 2014/0204869 A1 Jul. 24, 2014

Related U.S. Application Data

(60) Provisional application No. 61/755,150, filed on Jan. 22, 2013.

(51) Int. Cl.
*H04W 24/10* (2009.01)
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0057* (2013.01);
(Continued)

(58) Field of Classification Search
CPC ......... H04L 5/00; H04L 5/001; H04L 5/0053; H04L 5/0057; H04W 24/10; H04W 72/0406; H04W 72/042; H04W 72/048
(Continued)

(56) References Cited

U.S. PATENT DOCUMENTS

2011/0205161 A1 8/2011 Myers et al.
2012/0176924 A1* 7/2012 Wu ............... H04W 72/0406
370/252

(Continued)

FOREIGN PATENT DOCUMENTS

CN 102665230 A 9/2012
TW 201242405 A1 10/2012
(Continued)

OTHER PUBLICATIONS

Etsi, "LTE; Evolved Universal Terrestrial Radio Access (E-UTRA); Physical channels and modulation (3GPP TS 36.211 version 8.9.0 Release 8)", Jan. 2010, European Telecommunications Standards Institute, ETSI TS 136 211 V8.9.0, pp. 9-11.*

(Continued)

*Primary Examiner* — Un C Cho
*Assistant Examiner* — Shah Rahman
(74) *Attorney, Agent, or Firm* — Blue Capital Law Firm, P.C.

(57) ABSTRACT

Methods and apparatuses are disclosed to measure channel state information in a wireless communication system. The method includes selecting a subframe to be a reference resource for a channel state information (CSI) report on a Secondary Cell (SCell), in which the subframe is not a downlink (DL) subframe or a special subframe whose downlink portion is longer than a threshold on a Primary Cell (PCell). The method further includes executing a handling.

12 Claims, 5 Drawing Sheets

(52) U.S. Cl.
CPC ....... *H04W 24/10* (2013.01); *H04W 72/0406* (2013.01); *H04L 5/001* (2013.01); *H04W 72/048* (2013.01)

(58) Field of Classification Search
USPC .......................................................... 370/329
See application file for complete search history.

(56) References Cited

U.S. PATENT DOCUMENTS

| | | | |
|---|---|---|---|
| 2012/0207047 A1 | 8/2012 | Liao et al. | |
| 2012/0275398 A1* | 11/2012 | Chen | H04W 24/10 370/329 |
| 2012/0300641 A1* | 11/2012 | Chen | H04L 1/0026 370/241 |
| 2012/0307689 A1* | 12/2012 | Kim | H04L 1/1861 370/280 |
| 2012/0327821 A1* | 12/2012 | Lin | H04W 72/048 370/280 |
| 2013/0155898 A1* | 6/2013 | Yin | H04L 1/0026 370/254 |
| 2013/0194981 A1* | 8/2013 | Wang | H04L 1/1671 370/280 |
| 2013/0286933 A1* | 10/2013 | Lee | H04L 1/0026 370/315 |
| 2014/0126433 A1* | 5/2014 | Yang | H04L 5/001 370/280 |

FOREIGN PATENT DOCUMENTS

| | | |
|---|---|---|
| WO | 2012109989 A1 | 8/2012 |
| WO | 2012115364 A2 | 8/2012 |
| WO | 2012149028 A1 | 11/2012 |

OTHER PUBLICATIONS

3GPP TSG-RAN1#63bis meeting, Dublin, Ireland, Jan. 17-21, 2011.
3GPP TSG-RAN2#72bis meeting, Dublin, Ireland, Jan. 17-21, 2011.
Search Report on corresponding EP Patent Application No. 14152139.3 dated Jul. 31, 2014.
3GPP TSG-RAN WG1 #66, Athens, Greece, Aug. 22-26, 2011.
Office Action on corresponding foreign application (JP2014-009158) from JPO dated Oct. 14, 2014.
3GPP TSG RAN WG1 Meeting#70.
Office Action on corresponding TW Patent Application No. 103102059 dated Feb. 17, 2016.
Office Action on corresponding CN Patent Application No. 201410029787.4 dated Oct. 8, 2016.

* cited by examiner

PCell D S U U U D S U *U* U

*Periodic CSI*

SCell D S U D *D* D D D D D

*Valid downlink subframe*

FIG. 5

PCell D S U U U D S U U U D S *U*

*Periodic CSI*

SCell D S U U D D *D* D D D S U

*Valid downlink subframe*

FIG. 6

METHOD AND APPARATUS FOR CHANNEL STATE INFORMATION MEASUREMENT IN A WIRELESS COMMUNICATION SYSTEM

CROSS-REFERENCE TO RELATED APPLICATIONS

The present Application claims the benefit of U.S. Provisional Patent Application Ser. No. 61/755,150 filed on Jan. 22, 2013, the entire disclosure of which is incorporated herein by reference.

FIELD

This disclosure generally relates to wireless communication networks, and more particularly, to methods and apparatuses for channel state information measurement in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses are disclosed to measure channel state information in a wireless communication system. The method includes selecting a subframe to be a reference resource for a channel state information (CSI) report on a Secondary Cell (SCell), in which the subframe is not a downlink (DL) subframe or a special subframe whose downlink portion is longer than a threshold on a Primary Cell (PCell). The method further includes executing a handling.

BRIEF DESCRIPTION OF THE DRAWINGS

FIG. 5 is a diagram illustrating a possible collision between SCell valid downlink subframe and PCell Uplink subframe.

FIG. 6 is a diagram illustrating a possible collision between SCell valid downlink subframe and PCell special subframe.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. R1-124776, "On New Carrier Type", RP-121415, "New WI proposal: New Carrier Type for LTE", TS 36.211 V11.1.0, "E-UTRA Physical channels and modulation", TS 36.213 V11.1.0, "E-UTRA Physical layer procedures", R1-124717, "On collision between DM RS and PSS/SSS in new carrier". The standards and documents listed above are hereby expressly incorporated by reference in their entirety.

Figure 1:
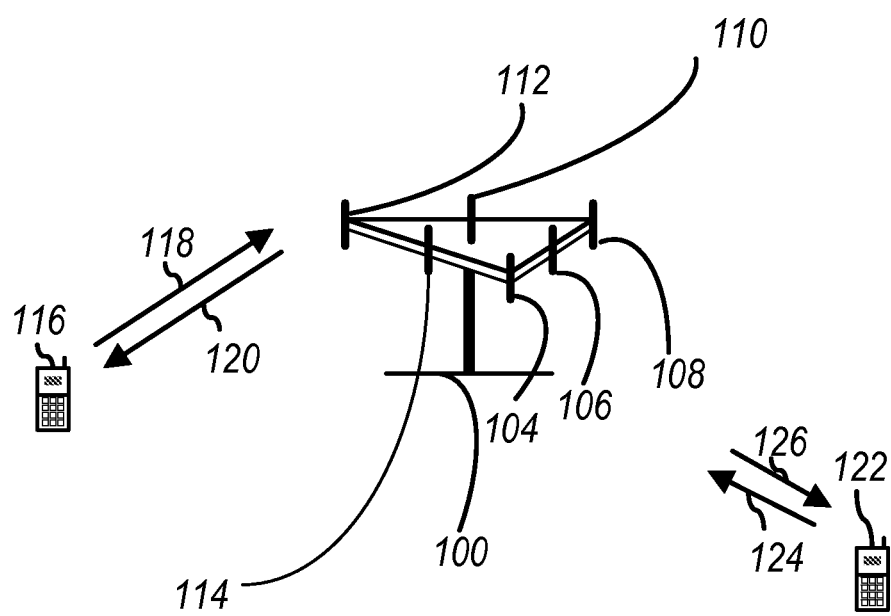
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNB, or some other terminology. An access terminal (AT) may also be called user equipment (UE), a wireless communication device, terminal, access terminal or some other terminology.

Figure 2:
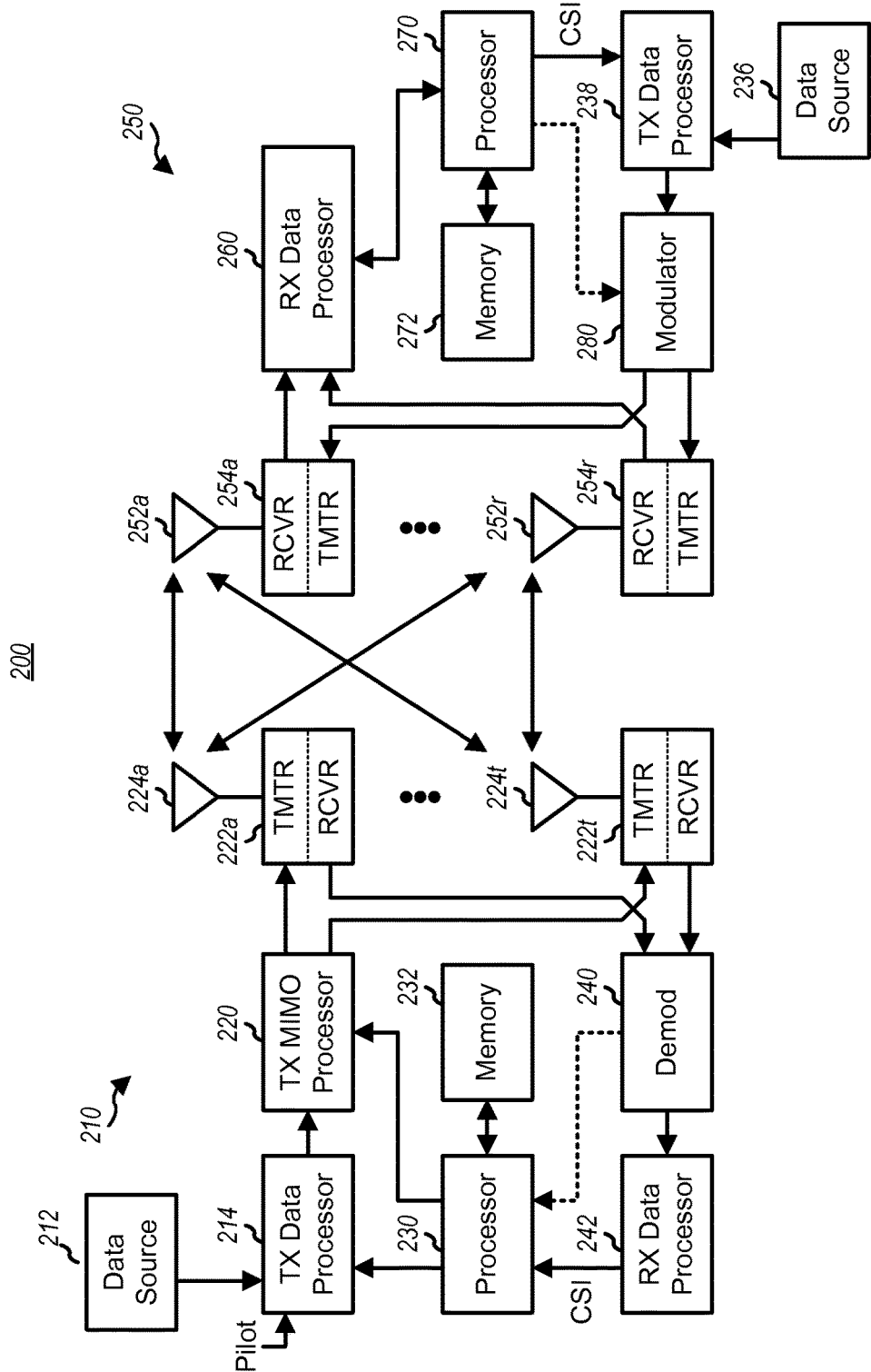
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
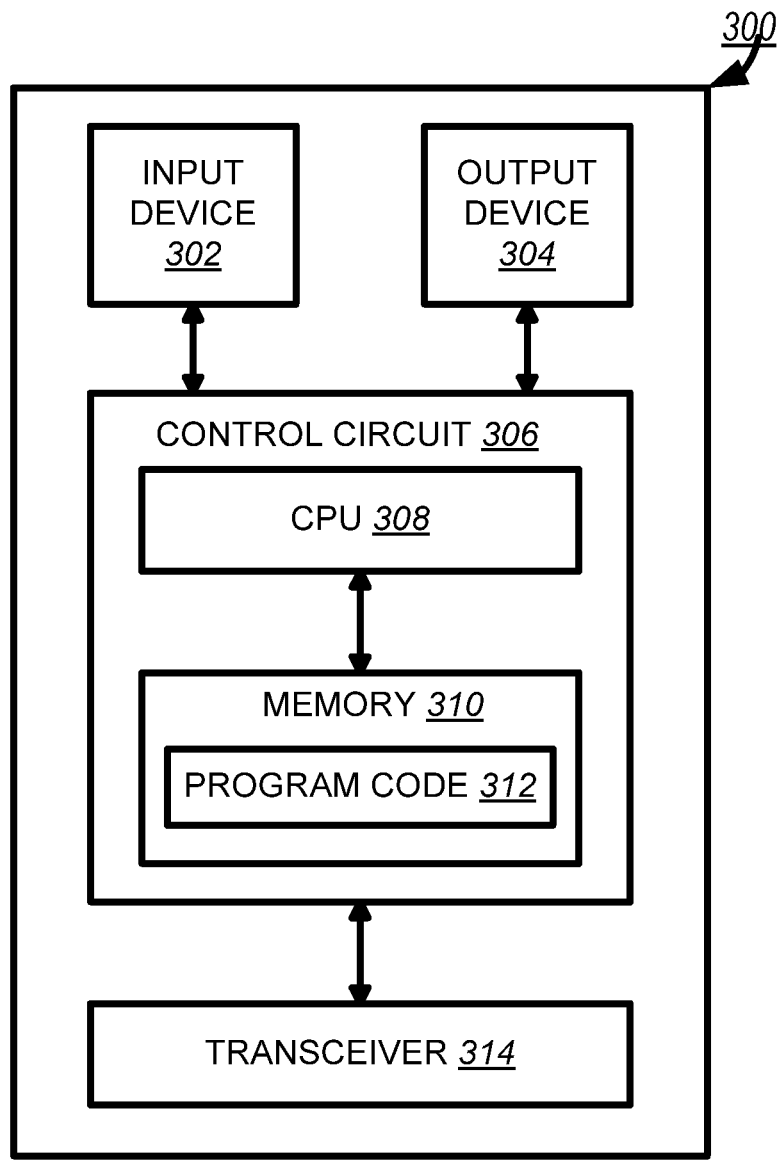
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
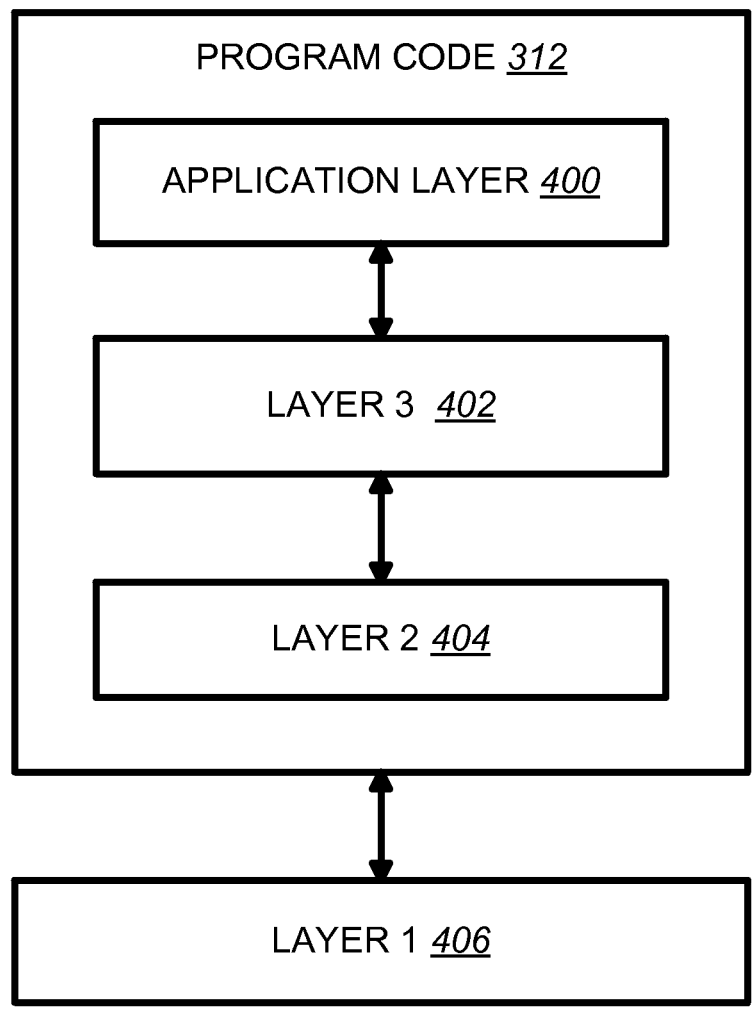
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

According to 3GPP, a UE performs channel state information (CSI) measurement based on the definition in TS 36.213 V11.1.0. Basically, the reference resource is several subframes prior to the CSI reporting subframe such that there is sufficient processing time for the UE to derive the content of CSI report as follows:

The CSI reference resource for a serving cell is defined as follows:
  In the frequency domain, the CSI reference resource is defined by the group of downlink physical resource blocks corresponding to the band to which the derived CQI value relates.
  In the time domain,
    for a UE configured in transmission mode 1-9 or transmission mode 10 with a single configured CSI process for the serving cell, the CSI reference resource is defined by a single downlink subframe $n-n_{CQI\_ref}$, where for periodic CSI reporting $n_{CQI\_ref}$ the smallest value greater than or equal to 4, such that it corresponds to a valid downlink subframe;

where for aperiodic CSI reporting $n_{CQI\_ref}$ is such that the reference resource is in the same valid downlink subframe as the corresponding CSI request in an uplink DCI format.

where for aperiodic CSI reporting $n_{CQI\_ref}$ is equal to 4 and downlink subframe $n-n_{CQI\_ref}$ corresponds to a valid downlink subframe, where downlink subframe $n-n_{CQI\_ref}$ is received after the subframe with the corresponding CSI request in a Random Access Response Grant.

for a UE configured in transmission mode 10 with multiple configured CSI processes for the serving cell, the CSI reference resource for a given CSI process is defined by a single downlink subframe $n-n_{CQI\_ref}$, where for FDD and periodic or aperiodic CSI reporting $n_{CQI\_ref}$ is the smallest value greater than or equal to 5, such that it corresponds to a valid downlink subframe;

where for FDD and aperiodic CSI reporting $n_{CQI\_ref}$ is equal to 5 and downlink subframe $n-n_{CQI\_ref}$ corresponds to a valid downlink subframe, where downlink subframe $n-n_{CQI\_ref}$ is received after the subframe with the corresponding CSI request in a Random Access Response Grant.

where for TDD, and 2 or 3 configured CSI processes, and periodic or aperiodic CSI reporting, $n_{CQI\_ref}$ is the smallest value greater than or equal to 4, such that it corresponds to a valid downlink subframe;

where for TDD, and 2 or 3 configured CSI processes, and aperiodic CSI reporting, $n_{CQI\_ref}$ is equal to 4 and downlink subframe $n-n_{CQI\_ref}$ corresponds to a valid downlink subframe, where downlink subframe $n-n_{CQI\_ref}$ is received after the subframe with the corresponding CSI request in a Random Access Response Grant;

where for TDD, and 4 configured CSI processes, and periodic or aperiodic CSI reporting, $n_{CQI\_ref}$ is the smallest value greater than or equal to 5, such that it corresponds to a valid downlink subframe;

where for TDD, and 4 configured CSI processes, and aperiodic CSI reporting, $n_{CQI\_ref}$ is equal to 5 and downlink subframe $n-n_{CQI\_ref}$ corresponds to a valid downlink subframe, where downlink subframe $n-n_{CQI\_ref}$ is received after the subframe with the corresponding CSI request in a Random Access Response Grant.

As described above, the reference resource should be based on a valid downlink subframe whose definition is as follows:

A downlink subframe in a serving cell shall be considered to be valid if:

it is configured as a downlink subframe for that UE, and except for transmission mode 9 or 10, it is not an MBSFN subframe, and it does not contain a DwPTS field in case the length of DwPTS is $7680 \cdot T_s$ and less, and it does not fall within a configured measurement gap for that UE, and for periodic CSI reporting, it is an element of the CSI subframe set linked to the periodic CSI report when that UE is configured with CSI subframe sets, and for a UE configured in transmission mode 10 with multiple configured CSI processes, and aperiodic CSI reporting for a CSI process, it is an element of the CSI subframe set linked to the downlink subframe with the corresponding CSI request in an uplink DCI format, when that UE is configured with CSI subframe sets for the CSI process.

If there is no valid downlink subframe for the CSI reference resource in a serving cell, CSI reporting is omitted for the serving cell in uplink subframe n.

According to 3GPP TS 36.213 V11.1.0 in Rel-11, Time Division Duplexing (TDD) carrier aggregation (CA) with different uplink (UL)/downlink (DL) configuration is introduced. Also, as disclosed in 3GPP TS 26.211, for TDD UE that is not able to receive and transmit in the aggregated cells:

For TDD inter-band CA with different UL-DL configurations on different bands and half duplex UEs, if the subframe type of an Scell is different from that of the Pcell in a subframe, the normal UE behavior applies with the following constraints:

for the subframe with "D" on the Pcell and "U" on the Scell, the UE is not expected to transmit any signal/channel on the Scell;

for the subframe with "U" on the Pcell and "D" on the Scell, the UE is not expected to receive any signal/channel on the Scell;

for the subframe with "D" on the Pcell and "S" on the Scell, the UE is not expected to transmit any signal/channel in the UpPTS on the Scell;

for the subframe with "S" on the Pcell and "D" on the Scell, the UE is not expected to receive PDSCH/EPDCCH/PMCH/PRS on the Scell; in addition, on the Scell the UE is not expected to receive any other signal in OFDM symbols that overlaps with guard period and/or UpPTS of PCell.

In the event that multiple cells with different uplink-downlink configurations are aggregated and the UE is not capable of simultaneous reception and transmission in the aggregated cells, the following constraints apply:

if the subframe in the primary cell is a downlink subframe, the UE shall not transmit any signal or channel on a secondary cell in the same subframe if the subframe in the primary cell is an uplink subframe, the UE is not expected to receive any downlink transmissions on a secondary cell in the same subframe if the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

For a TDD interband carrier aggregation (CA) half duplex UE, which is not able to receive and transmit simultaneously, a DL subframe n could be considered a valid downlink subframe and also the reference resource for the corresponding CSI report if there is a downlink (DL) subframe n on a secondary cell (SCell) and a periodic CSI report for the SCell will be reported four subframes later. Under certain combinations of primary cell (PCell) and SCell DL-Uplink (UL) configurations, the subframe n could be a UL subframe of PCell. Thus, it is possible for a UE to consider a subframe which it is not expected to receive channel/signal as a valid downlink subframe. In this case, the UE would report the CSI with useless information because the report would be based on a subframe that the UE may not be able to perform a measurement or a malfunction may occur. On the other hand, the evolved Node B (eNB) may also misinterpret the CSI report from the UE and make a wrong decision for scheduling. Possible examples are illustrated in FIGS. 5 and 6. It is noted that FIG. 6 shows the possibility that the two subframes after the valid downlink subframe are not the elements of the corresponding CSI subframe set.

According to various embodiments, when a subframe is considered to be reference resource for CSI report on a SCell, e.g. based on the above conditions, a handling is done if the subframe it is not a DL subframe, e.g. a special subframe or a UL subframe, on a PCell. More specifically, the DL part of the special subframe is shorter than a threshold. A non-limiting example of the handling is another subframe would be considered as a reference resource. Another example of the handling is the CSI report is omitted, e.g. UE skips or does not transmit the CSI report. Still another example of the handling is the CSI report contains a specific value.

In one embodiment, for a UE which is not able to receive and transmit simultaneously, a downlink subframe on the SCell would not be considered as a valid downlink subframe if a criterion is fulfilled. One example of the criterion is that it is a UL subframe on the PCell in the same subframe. Another example of the criterion is that it is a special subframe on the PCell in the same subframe. In one embodiment, the DL portion of the special subframe is shorter than a threshold. More specifically, a downlink subframe could be considered as a valid downlink subframe if the above criterion is not fulfilled, e.g. it is a DL subframe or special subframe whose downlink portion is longer than a threshold on the PCell in the same subframe. Note that whether a downlink subframe is considered as a valid downlink subframe may be subject to other conditions mentioned above, e.g. it does not fall within a configured measurement gap for that UE.

In another embodiment, for a UE which is not able to receive and transmit simultaneously, a first subframe prior to a second subframe is considered as a reference resource for the CSI report on a SCell if a criterion is fulfilled. One example of the criterion is that in the second subframe it is a UL subframe on the PCell. Another example of the criterion is that in the second subframe it is a special subframe on the PCell. In one embodiment, the DL portion of the special subframe is shorter than a threshold.

In yet another embodiment, a UE would perform an action for a SCell if a criterion is fulfilled. The action may be to omit the report, not transmit the report, skip the report, or set the content of the CSI report to a specific value. The specific value may be a fixed or predefined value. In this embodiment, one example of the criterion is that it is a UL subframe on the PCell in the same subframe as the corresponding reference resource of the CSI report. In this embodiment, another example of the criterion is that it is a special subframe on the PCell in the same subframe as the corresponding reference resource of the CSI report. In one embodiment, the DL portion of the special subframe is shorter than a threshold.

In another embodiment, an eNB cannot configure some subframe as CSI reporting subframe if a criterion is fulfilled. In this embodiment, the criterion is that the subframe would result in a reference resource such that in the same subframe of the reference resource of the CSI report it is UL subframe on a PCell. Another example of the criterion is that the subframe would result in reference resource such that in the same subframe of the reference resource of the CSI report it is special subframe on a PCell. In one embodiment, the DL part of the special subframe is shorter than a threshold.

Above embodiments are described for a UE which is not able to receive and transmit simultaneously, while it could as well be applied to a UE which is able to receive and transmit simultaneously.

The CSI report discussed above and herein may refer to one or any combination of an aperiodic CSI report or periodic CSI report.

The following is one exemplary embodiment:
A downlink subframe in a serving cell shall be considered to be valid if:
  it is configured as a downlink subframe for that UE, and
  for the case that multiple cells with different uplink-downlink configurations are aggregated and the UE is not capable of simultaneous reception and transmission in the aggregated cells, the subframe in the primary cell is neither a uplink subframe nor a special subframe with the length of DwPTS 7680·$T_s$ or less.
  except for transmission mode 9 or 10, it is not an MBSFN subframe, and
  it does not contain a DwPTS field in case the length of DwPTS is 7680·$T_s$ and less, and
  it does not fall within a configured measurement gap for that UE, and
  for periodic CSI reporting, it is an element of the CSI subframe set linked to the periodic CSI report when that UE is configured with CSI subframe sets, and
  for a UE configured in transmission mode 10 with multiple configured CSI processes, and aperiodic CSI reporting for a CSI process, it is an element of the CSI subframe set linked to the downlink subframe with the corresponding CSI request in an uplink DCI format, when that UE is configured with CSI subframe sets for the CSI process.

If there is no valid downlink subframe for the CSI reference resource in a serving cell, CSI reporting is omitted for the serving cell in uplink subframe n.

The following is another exemplary embodiment:
A downlink subframe in a serving cell shall be considered to be valid if:
  it is configured as a downlink subframe for that UE, and
  except for transmission mode 9 or 10, it is not an MBSFN subframe, and
  it does not contain a DwPTS field in case the length of DwPTS is 7680·$T_s$ and less, and
  it does not fall within a configured measurement gap for that UE, and
  for periodic CSI reporting, it is an element of the CSI subframe set linked to the periodic CSI report when that UE is configured with CSI subframe sets, and
  for a UE configured in transmission mode 10 with multiple configured CSI processes, and aperiodic CSI reporting for a CSI process, it is an element of the CSI subframe set linked to the downlink subframe with the corresponding CSI request in an uplink DCI format, when that UE is configured with CSI subframe sets for the CSI process.

If there is no valid downlink subframe for the CSI reference resource in a serving cell, CSI reporting is omitted for the serving cell in uplink subframe n. If multiple cells with different uplink-downlink configurations are aggregated and the UE is not capable of simultaneous reception and transmission in the aggregated cells and the subframe in the primary cell is a uplink subframe or a special subframe with the length of DwPTS is 7680·$T_s$ or less, CSI reporting is omitted for the serving cell in uplink subframe n.

Referring back to FIGS. 3 and 4, the device 300 includes a program code 312 stored in memory 310. In one embodiment, the CPU 308 could execute program code 312 to execute one or more of the following: (i) to select a subframe to be a reference resource for a channel state information (CSI) report on a Secondary Cell (SCell), in which the subframe is not a downlink (DL) subframe or special subframe whose downlink portion is longer than a threshold on a Primary Cell (PCell), and (ii) to execute a handling.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for measuring channel state information in a wireless communication system, the method comprising:
considering a first subframe to be a reference resource on a Secondary Cell (SCell) for a channel state information (CSI) report, wherein the first subframe is a downlink (DL) subframe on the SCell; and
selecting a second subframe, and not the first subframe, as a reference resource on the SCell for the CSI report if the corresponding first subframe is not a DL subframe on a Primary Cell (PCell) or not a TDD (Time Division Duplex) special subframe on the PCell whose downlink portion is above a threshold on the PCell.

2. A method for measuring channel state information (CSI) in a wireless communication system, the method comprising:
configuring Carrier aggregation;
considering a second subframe as a reference resource on a Secondary Cell (SCell) for a CSI report, wherein the second subframe is a downlink (DL) subframe on the SCell; and
selecting, by a user equipment (UE), a first subframe prior to the second subframe as a reference resource on the SCell for the CSI report if the corresponding second subframe is a uplink (UL) subframe on a Primary Cell (PCell) or a TDD (Time Division Duplex) special subframe on the PCell whose downlink portion is below a threshold on the PCell.

3. The method of claim 2, wherein the UE considers a subframe as a reference resource for the CSI report on the SCell if the subframe is a downlink (DL) subframe on the PCell or a TDD special subframe on the PCell whose downlink portion is above a threshold on the PCell.

4. The method of claim 2, wherein at least two carriers aggregated have different UL-DL configurations.

5. The method of claim 2, wherein the UE is not able to receive and transmit simultaneously.

6. A communication device for improving a channel state information (CSI) measurement in a wireless communication system, the communication device comprising:
a control circuit;
a processor installed in the control circuit;
a memory installed in the control circuit and operatively coupled to the processor;
wherein the processor is configured to execute a program code stored in the memory to improve a CSI measurement in a wireless communication system by:
considering selecting a first subframe to be a reference resource on a Secondary Cell (SCell) for a channel state information (CSI) report, wherein the corresponding first subframe is not a downlink (DL) subframe on a Primary Cell (PCell) or not a TDD (Time Division Duplex) special subframe on the PCell whose downlink portion is above a threshold on the PCell and the first subframe is a downlink subframe on the SCell; and
selecting a second subframe, and not the first subframe, as a reference resource on the SCell for the CSI report if the corresponding first subframe is not a downlink (DL) subframe on a Primary Cell (PCell) or not a TDD (Time Division Duplex) special subframe on the PCell whose downlink portion is above a threshold on the PCell.

7. A communication device for improving a channel state information (CSI) measurement in a wireless communication system, the communication device comprising:
a control circuit;
a processor installed in the control circuit;
a memory installed in the control circuit and operatively coupled to the processor;
wherein the processor is configured to execute a program code stored in the memory to improve a CSI measurement in a wireless communication system by:
considering a second subframe as a reference resource on a Secondary Cell (SCell) for a CSI report, wherein the second subframe is a downlink (DL) subframe on the SCell; and
selecting a first subframe prior to the second subframe as a reference resource on the SCell for the CSI report if the corresponding second subframe is a uplink (UL) subframe on a Primary Cell (PCell) or a TDD (Time Division Duplex) special subframe on the PCell whose downlink portion is below a threshold on the PCell.

8. The communication device of claim 7, wherein the program code further comprises:
selecting a subframe as a reference resource for the CSI report on the SCell if in the subframe it is a downlink (DL) subframe or a TDD (Time Division Duplex) special subframe on the PCell whose downlink portion is above a threshold on the PCell.

9. The communication device of claim 7, wherein at least two carriers aggregated have different UL-DL configurations.

10. The communication device of claim 7, wherein the UE is not able to receive and transmit simultaneously.

11. The communication device of claim 7, wherein the UE selects another prior subframe as a valid downlink subframe.

12. The communication device of claim 7, wherein the program code further comprises:
considering a subframe as a reference resource for the CSI report on the SCell if the subframe is a DL subframe on the PCell or a TDD (Time Division Duplex) special subframe on the PCell whose downlink portion is above a threshold on a PCell.

* * * * *